US010734121B2

(12) United States Patent
Pomirleanu et al.

(10) Patent No.: US 10,734,121 B2
(45) Date of Patent: Aug. 4, 2020

(54) DOUBLE-SEALED FUEL ROD END PLUG FOR CERAMIC-CONTAINING CLADDING

(71) Applicant: WESTINGHOUSE ELECTRIC COMPANY LLC, Cranberry Township, PA (US)

(72) Inventors: Radu O. Pomirleanu, Sewickley, PA (US); Edward J. Lahoda, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1751 days.

(21) Appl. No.: 14/205,823

(22) Filed: Mar. 12, 2014

(65) Prior Publication Data

US 2020/0118696 A1 Apr. 16, 2020

(51) Int. Cl.
*G21C 3/10* (2006.01)
*G21C 3/06* (2006.01)

(52) U.S. Cl.
CPC ................ *G21C 3/10* (2013.01); *G21C 3/06* (2013.01)

(58) Field of Classification Search
CPC ... G21C 3/02; G21C 3/16; G21C 3/06; G21C 3/344; G21C 3/10; G21C 3/17; G21C 21/02
USPC .......................................................... 376/440
See application file for complete search history.

(56) References Cited

U.S. PATENT DOCUMENTS

| | | | | | |
|---|---|---|---|---|---|
| 3,197,381 | A * | 7/1965 | Blake | G21C 1/022 | 376/424 |
| 3,291,699 | A * | 12/1966 | Trickett | G21C 3/16 | 376/416 |
| 4,612,159 | A * | 9/1986 | Abe | G21C 3/10 | 376/251 |
| 4,642,217 | A * | 2/1987 | Wilson | G21C 3/10 | 376/418 |
| 5,158,740 | A | 10/1992 | Boatwright | | |
| 5,447,683 | A * | 9/1995 | Montgomery | B23K 1/19 | 148/423 |
| 2003/0016777 | A1 | 1/2003 | Vandergheynst et al. | | |

(Continued)

FOREIGN PATENT DOCUMENTS

| | | | | |
|---|---|---|---|---|
| GB | 946344 | A * | 1/1964 | B23K 1/20 |
| GB | 1396244 | A * | 6/1975 | G21C 3/041 |

(Continued)

OTHER PUBLICATIONS

Katoh et al., Radiation-Tolerant Joining Technologies for Silicon Carbide Ceramics and Composites, available online Oct. 10, 2013.*

(Continued)

*Primary Examiner* — Marshall P O'Connor
(74) *Attorney, Agent, or Firm* — K&L Gates LLP

(57) ABSTRACT

The invention relates to sealing a fuel rod composite cladding tube composed of silicon carbide regardless of the fuel rod cladding design architecture (e.g., monolithic, duplex with monolithic SiC on the inside and a composite made with SiC fibers and SiC matrix on the outside) preferably with sealed SiC end plug caps, additionally sealed with an interior braze and exterior SiC final coating, thus providing a double sealed end plug barrier effective at retaining gas tightness and providing mechanical strength for the sealed end joint while providing high chemical resistance.

5 Claims, 3 Drawing Sheets

(56) References Cited

U.S. PATENT DOCUMENTS

| | | | | |
|---|---|---|---|---|
| 2006/0039524 A1* | 2/2006 | Feinroth | C04B 35/806 376/409 |
| 2015/0078505 A1* | 3/2015 | Xu | C04B 37/001 376/451 |

FOREIGN PATENT DOCUMENTS

| | | |
|---|---|---|
| JP | H02257090 | 10/1990 |
| JP | H05180986 | 7/1993 |
| JP | 2007327810 A | 12/2007 |
| WO | 2012146444 A1 | 11/2012 |
| WO | 2012174548 A1 | 12/2012 |
| WO | 2013017621 A1 | 2/2013 |

OTHER PUBLICATIONS

International Searching Authority, International Search Report and the Written Opinion for International Application No. PCT/US2015/015325, dated Nov. 27, 2015.

* cited by examiner

DOUBLE-SEALED FUEL ROD END PLUG FOR CERAMIC-CONTAINING CLADDING

BACKGROUND

1. Field

The invention relates to fuel rod cladding in a nuclear water reactor composed of a ceramic-containing material and, more particularly, to providing a double seal on one or both ends of the fuel rod cladding.

2. Description of Related Art

In a typical nuclear water reactor, such as a pressurized water reactor (PWR), heavy water reactor (e.g., a CANDU) or a boiling water reactor (BWR), the reactor core includes a large number of fuel assemblies, each of which is composed of a plurality of elongated fuel elements or fuel rods. Fuel assemblies vary in size and design depending on the desired size of the core and the size of the reactor. The fuel rods each contain nuclear fuel fissile material, such as at least one of uranium dioxide ($UO_2$), plutonium dioxide ($PuO_2$), thorium dioxide ($ThO_2$), uranium nitride (UN) and uranium silicide ($U_3Si_2$) or mixtures thereof. At least a portion of the fuel rods can also include neutron absorbing material, such as, boron or boron compounds, gadolinium or gadolinium compounds, erbium or erbium compounds and the like or mixtures thereof. The neutron absorbing material may be present on or in pellets in the form of a stack of nuclear fuel pellets. Annular or particle forms of fuel also can be used.

Each of the fuel rods has a cladding that acts as containment to hold the fissile material. The fuel rods are grouped together in an array which is organized to provide a neutron flux in the core sufficient to support a high rate of nuclear fission and thus, the release of a large amount of energy in the form of heat. A coolant, such as water, is pumped through the reactor core to extract the heat generated in the reactor core for the production of useful work such as electricity.

The cladding on the fuel rods may be composed of zirconium (Zr) and may include as much as about two percent by weight of other metals, such as niobium (Nb), tin (Sn), iron (Fe) and chromium (Cr). A recent development in the art has provided fuel rod cladding composed of a ceramic-containing material, such as silicon carbide (SiC). The cladding of each fuel rod has a plug or cap positioned at each end. Further, a hold down device, such as a metal spring, is provided in the fuel rod to maintain the configuration of the stack of nuclear fuel pellets.

FIG. 1 illustrates a prior art design which shows a stack of fuel pellets 10, a zirconium-based cladding 12, a spring hold down device 14, and end plugs 16. One of the end plugs, i.e., the one positioned closest to the hold down device 14, is typically referred to as the top end plug.

It is necessary to seal the end plugs of the cladding to isolate the fuel contained therein from the reactor core environment. There are known sealing technologies that employ various materials such as Ti-based or Al—Si based compositions as well as brazing and other conventional methods to seal SiC cladding and end plugs. These materials demonstrate high mechanical strength and the ability to provide for gas-tightness. However, there are disadvantages associated with these known sealing materials, such as a failure to exhibit a level of corrosion resistance necessary for a component exposed to a nuclear reactor environment. Further, some known sealing technologies, such as spark plasma sintering, are not economically feasible for large-scale manufacture.

Thus, it is desired in the art to develop sealing technology for fuel rod cladding, in particular, SiC-containing cladding, that exhibits one or more of the following characteristics and properties:

- ensures mechanical strength during and after normal operation, anticipated operational occurrences, infrequent accidents, and limiting faults;
- ensures hermeticity of the end plug-to-cladding joint under irradiation and a nuclear reactor-specific corrosive environment;
- allows the joining process to accommodate fully-loaded cladding (with fuel pellets and a hold down device);
- allows for pressurization of the fuel road with helium or other thermally conductive backfill gas at pressures typically up to 300 psi; and
- allows the joining process to accommodate large-scale production for commercial applications.

It is an object of this invention to provide a method for producing high strength, hermetically sealed, commercially useful and viable end plug seals, resistant to irradiation in a nuclear environment using ceramic composite cladding for containing fuel pellets.

SUMMARY OF THE INVENTION

In one aspect, the invention provides a method of sealing a ceramic-containing cladding for a nuclear fuel rod in a core of a nuclear water reactor. The method includes providing the cladding which includes a tubular wall, a cavity formed by the tubular wall, a first open end, a second open end, and an internal diameter. The method further includes providing a first end plug and a second end plug, wherein the first and the second end plugs each comprise a top surface, a bottom surface, an exterior surface, a length extending there between and an exterior diameter which is less than the interior diameter of the cladding; inserting and sealing the first end plug into the first open end of the cladding; loading nuclear fuel and a hold down device into the cavity; depositing a brazing material onto at least a portion of the exterior surface of the second end plug to form a first coating thereon; inserting the second end plug having the first coating thereon into the second open end of the cladding, wherein the bottom surface of the second end plug is positioned within a portion of the cavity and the top surface forms a closed second end of the cladding; heating the second end plug having the first coating thereon to a temperature at or above a melt temperature of the brazing material to at least partially melt the brazing material; cooling the second end plug having the first coating thereon to form a first seal between the second end plug and the cladding; and depositing a second coating which comprises SiC on the top surface of the second end plug and on at least a portion of the cladding to form a second seal on the cladding.

In certain embodiments, the method further includes forming an opening in the second end plug to allow for passing of gas into the cavity. The opening can be filled with the brazing material.

Further, the first end plug can be sealed in the first open end of the cladding using the method described above for sealing the second end plug in the second open end of the cladding.

In another aspect, the invention provides a method of sealing open ends of a nuclear fuel rod cladding for a nuclear water reactor. The cladding is composed of a material including silicon carbide, having a first open end and a second open end, an internal cavity, an internal diameter and nuclear fuel disposed within the internal cavity. The method includes providing the nuclear fuel rod cladding, a first end plug, a second end plug and a brazing composition; applying the brazing composition to at least a portion of the first end plug and the second end plug; applying heat to the brazing composition to form a coating; and inserting the first end plug with the coating into the first open end and the second end plug with the coating into the second open end of the nuclear fuel cladding, the first and the second end plugs each including a top surface, a bottom surface and a length extending there between, the bottom surface being positioned inside a portion of the internal cavity and the top surface forming a first closed end and a second closed end of the cladding, wherein each of the first end plug and the second end plug have an external diameter, the external diameter being less than the internal diameter of the cladding such that a space is formed there between, and the coating applied on the first and second end plugs being such that the coating at least partially fills a portion of the space.

In certain embodiments, the method further includes applying a SiC-containing composition to the top surface of each of the first and the second end plugs inserted in the first and the second open ends, respectively, and to at least a portion of the cladding to form a second coating thereon and to provide a second seal. the method includes inserting only one end plug in the cladding prior to and during loading of the fuel in the internal cavity and the second end plug is inserted upon completion of the loading of the fuel.

In yet another aspect, the invention provides a tubular ceramic composite cladding for a nuclear water reactor. The cladding is composed of a material including silicon carbide, having a first open end and a second open end, an internal cavity, an internal diameter and nuclear fuel disposed within the internal cavity. The composite includes a first end plug and a second end plug, a brazing composition applied to at least a portion of the first end plug and the second end plug, a first coating on each of the first and second end plugs formed by application of heat to the brazing composition, a SiC-containing composition applied to a top surface of each of the first and the second end plugs inserted in the first and the second open ends such that the top surface of each of the first and second end plugs forms a first and a second closed end, respectively, and to at least a portion of the cladding, and a second coating formed by the SiC-containing composition on the top surface of each of the first and the second end plugs and the at least a portion of the cladding.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
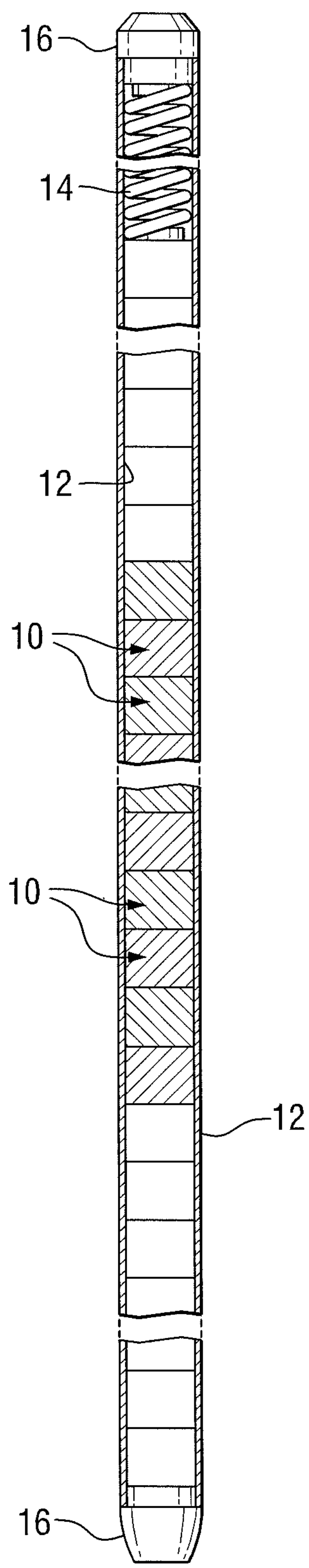
FIG. 1 is an enlarged longitudinal sectional view of a prior art zirconium alloy fuel rod containing fuel pellets, hold down spring, and end caps.

The present invention relates generally to fuel rod cladding and a method for sealing the ends of the cladding. The fuel rod cladding is typically in the shape of an elongated tube having a cavity formed therein and two opposing open ends. The cavity has fuel pellets contained therein and typically a hold down device, such as a spring, to maintain the configuration, e.g., a stack, of the fuel pellets. The fuel rod cladding is positioned in the core of a nuclear water reactor. An end cap or plug is positioned at or en each open end of the cladding to provide a seal and prevent reactor coolant circulating in the core from entering the fuel rod cladding.

The invention includes a dual or double seal to enclose or partially enclose the ends, e.g., end caps, of the cladding. The double seal can be provided in a two-step method. One step employs conventional brazing technology to attach and seal an end plug to an interior surface and/or end face of the fuel rod cladding. Known brazing technology includes the use of an aluminum-silicon (Al—Si) sealing compound. The other step employs conventional chemical vapor deposition (CVD) or chemical vapor infiltration (CVI) technology to provide a sealing barrier to connect the end plug to the cladding. As used herein and the claims, CVI refers to depositing ceramic matrix material in pores using decomposed gaseous ceramic matrix precursors and CVD refers to depositing ceramic matrix material on surfaces using decomposed gaseous ceramic matrix precursors.

The cladding is composed of a ceramic-containing material. Due to the known brittleness associated with ceramic, the cladding material is typically a combination of ceramic and another material. It is known in the art to construct fuel rod cladding of silicon carbide (SiC).

Non-limiting examples of suitable cladding materials include silicon carbide (SiC) fiber reinforced composites. These composites may have two or three layers. The two-layer composite includes a cladding of high purity beta or alpha phase stoichiometric SiC at least partially covered by a layer of continuous beta phase stoichiometric SiC fibers infiltrated with beta phase SiC. The three-layer composite includes an additional outer protective layer of fine grained beta phase SiC. In certain instances, it is typical to pre-stress the fiber component forming the fibers into tows and tow reverse winding overlapping, where the fibers are coated with less than one micrometer of carbon or graphite or boron nitride to provide a weak interface allowing fiber slippage. This process may be conducted to improve crack propagation resistance. United States Patent Publication No. 2006/0039524 A1 to Feinroth et al. which is herein incorporated by reference, describes such nuclear fuel tubes and matrix densification using well known processes of chemical vapor infiltration (CVI) or polymer impregnation and pyrolysis (PIP).

The invention is applicable to a wide variety of cladding compositions and designs known in the art, such as but not limited to monolithic, duplex with monolithic SiC on the inside and a composite made with SiC fibers and SiC matrix on the outside.

In certain embodiments of the invention, the end plugs are constructed of the same material composition as the cladding. Each of the two end plugs may be inserted into the opposing ends of the cladding at the same time or one end plug may be inserted prior to the other. In a conventional fuel loading process, one end plug is inserted and attached to an open end of the cladding such as to seal the one end, the fuel pellets and stack hold down are then loaded into the cladding, and following loading the other end plug is inserted and attached to the other open end of the cladding. As an alternative, the fuel pellets and stack hold down may be loaded into the cladding and subsequently, both of the end plugs may be inserted and attached to the open ends of the cladding.

In accordance with the invention, each of the end plugs is joined and sealed to an open end of the cladding using a joining material, e.g., braze. As described herein, this step can be carried out in accordance with conventional compositions, equipment and processes known in the art. The joining material utilized is selected such that it has sufficient strength and high-temperature capability to ensure the joint integrity during the CVI or CVD process that is conducted in the second step. In alternate embodiments, the joining material may or may not be capable of exhibiting sufficient corrosion resistance in a nuclear reactor environment. The joining material may be deposited on at least a portion of the external surface of the end plug to form a coating thereon. The structure of the end plug typically has a top surface, a bottom surface and a length extending there between, wherein the length has an outside diameter. The outside diameter may be the same from the top surface to the bottom surface or the outside diameter may vary over the length of the end plug. The bottom surface is typically positioned within the cladding cavity and the top surface is positioned at the end face of the cladding. For example, the top surface of the end plug can be substantially flush with the end face of the cladding or may protrude beyond the end face of the cladding. The joining material may also be deposited on the interior surface of the cladding, e.g., a cavity wall, and preferably, in a location wherein the end plug is inserted into the cladding. Following deposition, the joining material is thermally cured to form the coating. As used herein and in the claims, the term "cured" as it relates to the joining material refers to the process of joining the material to the cladding such that it provides both strength and sealing capability. The thermal treatment at which the joining material is cured is above the temperature normally required for a CVI or a CVD process involving SiC deposition (approximately 1000° C.). A non-limiting example of a joining material is Al—Si with Si content greater than about 60%. Other compounds such as titanium foils or Ti-base may also be used.

During this first sealing step, the rod may be pressurized with an inert gas, such as helium (He), e.g., up to 300 psi, as in conventional designs or other backfill gas, e.g., gas having similar or improved thermal conductivity, such as hydrogen. Alternatively, a central hole or opening may be formed in an end plug to allow entry of the gas there through to pressurize the rod. Afterwards, the hole or opening may be at least partially filled and sealed with the joining material as described above. Conventional fuel rod end plug designs include a central hole formed therein, however, in certain embodiments, wherein sealing with a high-temperature braze is conducted in a pressurized chamber, a central hole or opening in the end plug is not needed.

Following this first sealing step, a second seal is applied by employing CVI or CVD to deposit SiC on the surface of the fuel rod cladding including the surface, e.g., top surface, of the end plugs. It is advantageous to perform this step on a plurality of rods simultaneously since the process times associated with CVI and CVD are significant. In certain embodiments, the temperature in the CVI or CVD reactor is controlled such that the deposition occurs preferentially at the top of the cladding and over the top end plug. As previously mentioned herein, the end plug which is positioned in closest proximity to the stack hold down is typically referred to as the "top" end plug.

Figure 2:
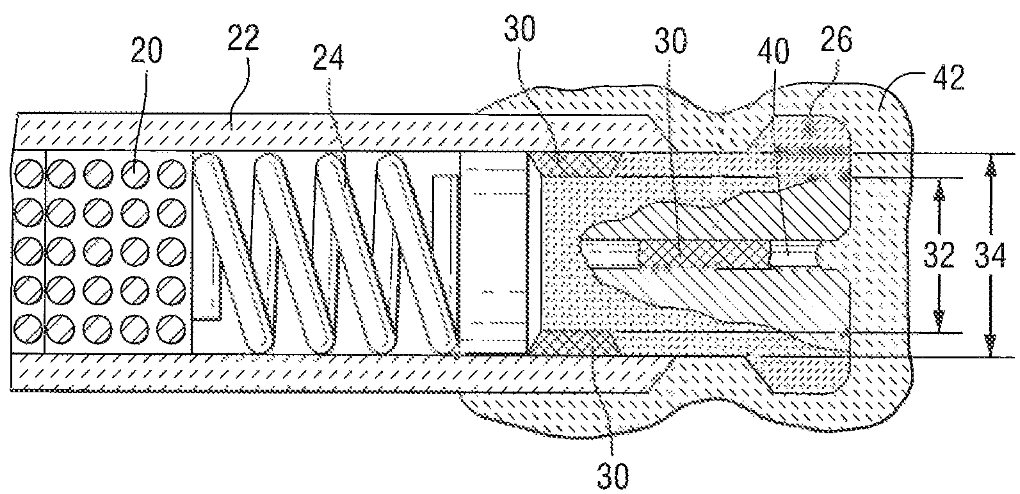
FIG. 2 illustrates a cross sectional view of a sealed ceramic composite fuel rod cladding having an interior braze and a CVI/CVD applied SiC coating over the end plug, in accordance with certain embodiments of the invention.

FIG. 2 illustrates a portion of a double-sealed fuel rod cladding tube 22 in accordance with certain embodiments of the invention, wherein a joint 30 (i.e., joining material that seals the end cap to cladding) is located at the interior surface of the cladding tube. As shown in FIG. 2, a stack of fuel pellets 20 and a hold down device 24 are contained inside the cladding 22. The fuel pellets 20 are held in place by the hold down device 24. A top end plug 26 is inserted in the end of the cladding 22 and is secured by a dual seal. The first seal includes a brazing material 30 deposited between the exterior surface of the top end plug 26 and the inside surface of the cladding 22. The outer diameter 32 of the top end plug 26 is less than the inside diameter 34 of the cladding 22. Thus, there is a gap or space between the outer diameter 32 and the inside diameter 34 and this space at least partially includes the brazing material 30. In certain embodiments, the brazing material 30 is selected from the group consisting of Si, Al, C, Ti, Zr, Ca, Na, Mg, K, Li, Ce, Fe, Cr, Ni, Zn, Pb, and combinations thereof. In certain embodiments, the brazing material is in a precipitated form.

FIG. 2 also shows a fill hole 40 centrally formed in the top end cap 26 as a means of pumping inert gas into the interior of the cladding 22. After the inert gas is provided, the brazing material 30 is inserted into the fill hole 40 in order to seal this opening. In the invention, the fill hole 40 is optional.

Further, FIG. 2 shows a ceramic-containing coating 42 deposited over the top surface of the top end plug 26 and at least a portion of the cladding 22. In certain embodiments, the coating 42 is composed of SiC and may be applied by a conventional CVI or CVD process. The coating 42 is effective to completely encloses or encapsulate the end of the cladding 22 and the entire outer top surface of the end plugs 26

In accordance with the invention, the brazing material 30 and the coating 42 provide a leak-free, double-sealed hermetic seal for the fuel pellets contained within the cladding 22.

Figure 3:
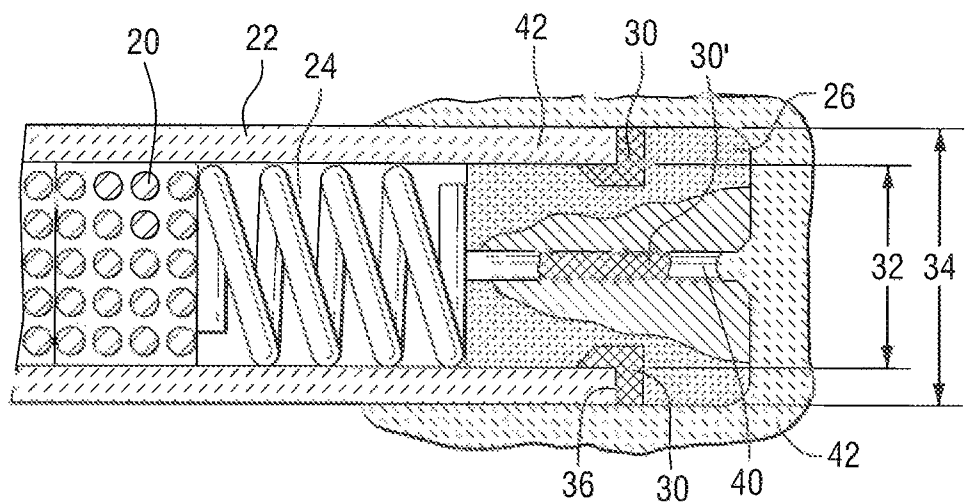
FIG. 3 illustrates a cross-sectional view of a ceramic composite fuel rod cladding having a braze, and a CVI/CVD applied SiC coating over the end plug, in accordance with certain embodiments of the invention.

FIG. 3 illustrates a double-sealed fuel rod cladding tube 22 in accordance with certain embodiments of the invention, wherein a seal is located primarily at the end face of the cladding 22. FIG. 3 includes the tubular ceramic composite cladding 22, the stack of fuel pellets 20, the hold down device 24, the top end plug 26, the fill hole 40, the ceramic-containing coating 42 and brazing material 30 as shown in FIG. 2. In FIG. 3, the brazing material 30 is deposited at the end face, e.g., the squared end 36, of the cladding 22. That is, the brazing material 30 is between a squared end 36 of the end of the cladding 22 and the top end cap 26.

In certain embodiments, the deposition of the brazing material 30 as shown in FIGS. 2 and 3 may be combined to provide a double-sealed top end plug 26 including the brazing material 30 deposited at the cladding end face, e.g., the square end 36, and the brazing material 30 deposited on the interior portion of the cladding 22 wherein the outer diameter 32 of the top end plug 26 is less than the interior diameter 34 of the cladding 22 so as to form a gap or space. Further, in this embodiment, brazing 30 is shown filling the fill hole 40.

Figure 4:
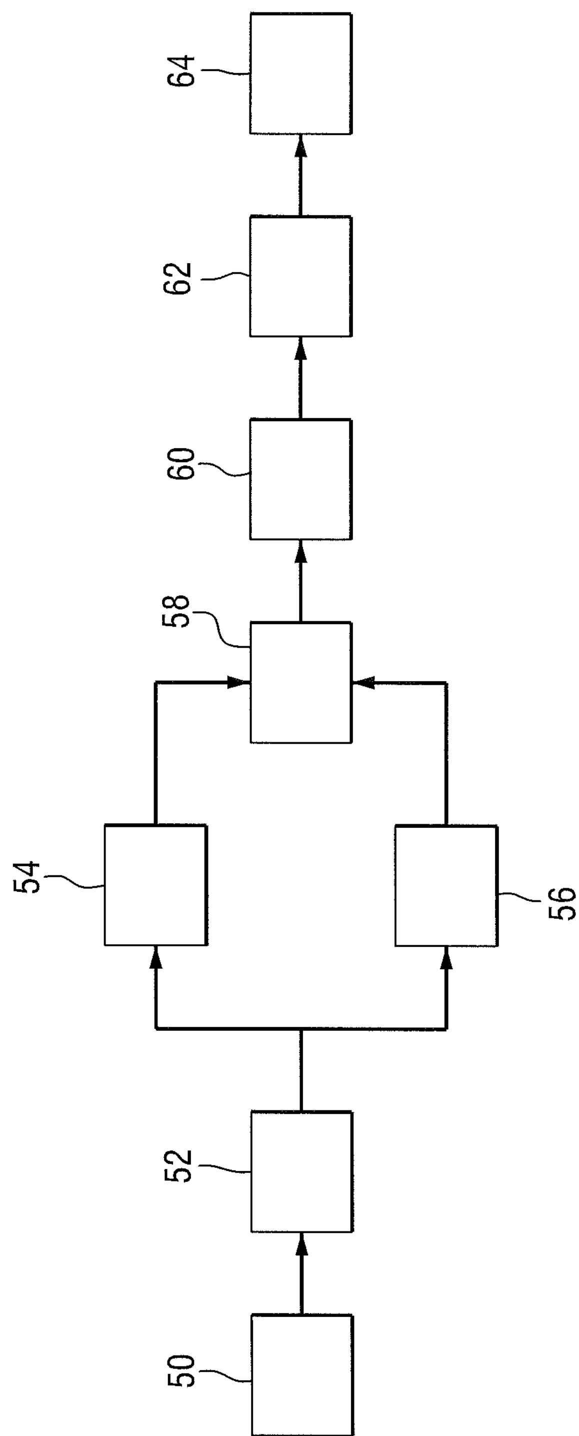
FIG. 4 illustrates a schematic block diagram method for applying a cladding double end seal, in accordance with certain embodiments of this invention.

Referring now to FIG. 4, which illustrates the method of this invention in a box flow diagram, where a tubular ceramic composite cladding having none or one end plug installed with sealing material is supplied 50. The ceramic composite cladding 50 is filled 52 with nuclear fuel and hold down spring or other device. The one or two of the end plugs on the ceramic composite cladding open ends is then sealed utilizing a braze material wherein the braze material is applied at an interface interior to the ceramic composite 54 and/or at an exterior end of the ceramic composite interface with the end plug 56. The end plug and ceramic composite cladding is heated 58 to elevate the temperature of up to 2500° C., preferably 1000° C. to 2500° C., over a period of about 10 minutes to 120 minutes, to provide a hermetically sealed fuel rod 60. Finally a sealing layer of ceramic material using CVI and/or CVD 62 is applied to the end plug and at least a portion of the ceramic composite cladding to produce a double-sealed end joint on a hermetically sealed fuel rod 64.

EXAMPLES

Example 1

A 12 foot-long SiC composite cladding tube was supplied to the fuel manufacturer. One end of the cladding was sealed using a SiC plug that was coated with a 60% Si/40% Al alloy brazing compound which was pushed onto the end of the cladding tube while the end was heated to 1300° C. at 100° C./min and held for 30 seconds, and then allowed to cool to room temperature. The ceramic tube was then filled with uranium ceramic pellets and a hold down spring, and pressurized with He gas to 300 psia. The final end plug was applied using a SiC plug that was coated with a 60% Si/40% Al alloy brazing compound which was pushed onto the end of the cladding tube while the end was heated to 1300° C. at 100° C./min and held for 30 seconds, and then allowed to cool to room temperature. A 10-micron coating of SiC was subsequently applied to the entire rod using CVD at 1000° C. to provide chemical resistance.

Example 2

A 12 foot-long SiC composite cladding tube was supplied to the fuel manufacturer with one end already sealed. The cladding tube was filled with uranium ceramic pellets and a hold down spring. An end plug with a fill hole centrally formed therein was applied to the open end of the cladding tube using a SiC plug that was coated with a 60% Si/40% Al alloy brazing compound which was pushed onto the end of the cladding tube while the end was heated to 1300° C. at 100° C./min and held for 30 seconds, and then allowed to cool to room temperature. The tube was first evacuated and then pressurized with He gas to 300 psia. A 60% Si/40% Al alloy brazing compound was inserted into the file hole and the end heated to 1300° C. at 100° C./min and held for 30 seconds, and allowed to cool to room temperature while maintaining a holding pressure between the plug and the rod. A-10 micron coating of SiC was then applied to the entire rod using CVD at 1000° C. to provide chemical resistance.

In general, in providing a double-sealed end plug in a fuel rod cladding, the invention takes into account the following information.

The temperature of the ceramic composite cladding in the immediate vicinity of the top (second) end plug joint (where the holddown device is located) is likely close to or the same temperature of the coolant water (whether the coolant water is in the form of a liquid or steam). Therefore, sealing technology capable of retaining gas-tightness and mechanical strength in the range of 300° C. to 400° C. is sufficient. However, such may not be sufficient for providing necessary corrosion resistance.

For beyond-design basis accidents, e.g., station black-out, where the cladding and its end plug joints are exposed to high-temperature steam for extended periods of time, it is only the SiC portions of the fuel rod that are expected to provide protection for extended time periods.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of sealing a ceramic-containing cladding of a nuclear fuel rod in a core of a nuclear water reactor, comprising:

providing the ceramic-containing cladding which comprises:

a tubular wall having an interior surface and an exterior surface;

a cavity formed by the tubular wall;

an end;

an opening formed in the end; and an interior diameter;

providing an end plug, comprising:

a top surface;

an opposing bottom surface;

an exterior surface extending between the top and bottom surfaces; and an exterior diameter, wherein, the interior diameter of the ceramic-containing cladding is greater than the exterior diameter of the end plug, such as to form a gap there between;

inserting the end plug into the opening in the end of the ceramic-containing cladding, wherein, the bottom surface of the end plug is positioned within a portion of the cavity and the top surface forms an end face of the ceramic-containing cladding;

positioning a brazing material in at least a portion of the gap;

heating the brazing material to a temperature at or above a thermal cure temperature of the brazing material to form a thermally cured brazing material;

forming a first seal with the thermally cured brazing material between the exterior surface of the end plug and the interior surface of the ceramic-containing cladding; and forming a second seal on the end of the ceramic-containing cladding, comprising:

depositing a coating which comprises SiC on the top surface of the end plug and on at least a portion of the exterior surface of the ceramic-containing cladding;

enclosing entirely the top surface of the end plug with the coating; and enclosing completely the end of the cladding with the coating.

2. The method of claim 1, further comprising inserting the brazing material into a fill hole formed in the end plug.

3. The method of claim 1, wherein the positioning the brazing material comprises:

depositing the brazing material onto at least one of a portion of the exterior surface of the end plug and a portion of the interior surface of the ceramic-containing cladding; and inserting the end plug into the opening in the end of the ceramic containing cladding, such that the brazing material forms an interface between the exterior surface of the end plug and the interior surface of the ceramic-containing cladding.

4. A method of sealing an open end of a nuclear fuel rod cladding for a nuclear water reactor, comprising:

providing the cladding, comprising:

a material including silicon carbide;

an end;

an opening in the end;

a tubular wall having an internal surface and an external surface;

an internal cavity formed by the tubular wall; and an internal diameter, wherein, nuclear fuel is disposed within the internal cavity;

providing an end plug, comprising:

a top surface;

an opposing bottom surface;

an external surface extending between the top and bottom surfaces; and an external diameter, wherein, the internal diameter of the ceramic-containing cladding is greater than the external diameter of the end plug;

providing a brazing composition;

applying the brazing composition to contact at least a portion of both of the external surface of the end plug and the internal surface of the cladding;

applying heat to the brazing composition to form a thermally cured brazing composition;

inserting the end plug with the thermally cured brazing composition into the opening in the end, the bottom surface being positioned inside a portion of the internal cavity and the top surface forming a closed end of the cladding, wherein the thermally cured brazing composition forms a first seal between the internal surface of the cladding and the external surface of the end plug; and forming a second seal on the end of the ceramic-containing cladding, comprising:

applying a SiC-containing coating to the top surface of the end plug inserted in the opening in the end, and at least a portion of the external surface of the cladding;

enclosing entirely the top surface of the end plug with the coating; and enclosing completely the end of the cladding with the coating.

5. A tubular ceramic composite cladding for a nuclear water reactor, comprising:

the cladding, comprising:

a material including silicon carbide;

an end;

a tubular wall having an internal surface and an external surface;

an internal cavity formed by the tubular wall; and an internal diameter, wherein, nuclear fuel is disposed within the internal cavity;

an end plug, comprising:

a top surface;

an opposing bottom surface;

an external surface extending between the top and bottom surfaces; and an external diameter, wherein, the internal diameter of the ceramic-containing cladding is greater than the external diameter of the end plug;

a space formed between the external surface of the end plug and the internal surface of the cladding;

a first seal, comprising:

a thermally cured brazing composition applied to at least one of a portion of the external surface of the end plug and a portion of the internal surface of the ceramic-containing cladding, wherein the thermally cured brazing composition fills the space; and a second seal, comprising:

a SiC-containing coating on the top surface of the end plug that is inserted in the end of the cladding and forms an end face, and extends over at least a portion of the external surface of the cladding, to enclose entirely the top surface of the end plug and enclose completely the end of the cladding with the coating.

* * * * *